United States Patent
Hayashi et al.

(10) Patent No.: US 7,980,710 B2
(45) Date of Patent: Jul. 19, 2011

(54) RETROREFLECTIVE ARTICLE

(75) Inventors: Chihiro Hayashi, Toyama (JP); Ikuo Mimura, Toyama (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 58 days.

(21) Appl. No.: 12/530,667

(22) PCT Filed: Mar. 28, 2008

(86) PCT No.: PCT/JP2008/056127
§ 371 (c)(1),
(2), (4) Date: Sep. 10, 2009

(87) PCT Pub. No.: WO2008/123429
PCT Pub. Date: Oct. 16, 2008

(65) Prior Publication Data
US 2010/0110545 A1    May 6, 2010

(30) Foreign Application Priority Data

Mar. 30, 2007  (JP) ................................. 2007-090750
Mar. 24, 2008  (JP) ................................. 2008-075060

(51) Int. Cl.
   *G02B 5/124*    (2006.01)

(52) U.S. Cl. ..................................... 359/530

(58) Field of Classification Search .................. 359/529, 359/530
See application file for complete search history.

(56) References Cited

U.S. PATENT DOCUMENTS

| 5,840,405 | A | 11/1998 | Shusta et al. |
| 6,568,817 | B1 | 5/2003 | Mimura et al. |
| 2003/0100637 | A1* | 5/2003 | Mimura et al. .................. 524/89 |
| 2005/0221042 | A1 | 10/2005 | Chirhart et al. |

FOREIGN PATENT DOCUMENTS

| CN | 1150408 | 5/2004 |
| CN | 1188714 | 2/2005 |
| JP | 46-025177 | 7/1971 |
| JP | 2000-509167 | 7/2000 |
| JP | 2001-033609 | 2/2001 |
| JP | 2001-290013 | 10/2001 |
| JP | 2005-125684 | 5/2005 |
| JP | 2006-317851 | 11/2006 |
| JP | 2007-093629 | 4/2007 |

OTHER PUBLICATIONS

International Search Report, PCT/JP2008/056127, Jun. 24, 2008.
Chinese Official Action—200880007854.5—Sep. 8, 2010.

* cited by examiner

*Primary Examiner* — Euncha P Cherry
(74) *Attorney, Agent, or Firm* — Young & Thompson

(57) ABSTRACT

A retroreflective article including a retroreflective element layer having an array of a large number of total internal reflective cube corner retroreflective elements, an optical property-adjusting layer partially provided on the back side of the retroreflective element layer, and an air layer on the back side of the optical property-adjusting layer. The retroreflective article exhibits optical properties suited for an intended use, such as a reflector of traffic or commercial signs, such as traffic signs, regulating signs, informative signs, and construction signs, or visible, laser or infrared light reflective sensors, by the presence of the optical property-adjusting layer with an adjusted hue or an adjusted area ratio. The retroreflective article can easily be produced at low cost and high efficiency by utilizing an existing retroreflective article.

20 Claims, 3 Drawing Sheets

RETROREFLECTIVE ARTICLE

TECHNICAL FIELD

This invention relates to a retroreflective article having a novel structure.

More particularly, it relates to a retroreflective article having a retroreflective element layer in which a number of total internal reflective, cube corner retroreflective elements are arrayed and an optical property-adjusting layer partially provided on the back side of the retroreflective element layer.

Even more particularly, the invention relates to a retroreflective article having a retroreflective element layer, in which a large number of retroreflective elements of at least one kind selected from the group consisting of a triangular pyramidal cube corner element, a full-cube corner element, a semifull-cube corner element, a tent prism type cube corner element, and a cross prism element are arrayed, and an optionally colored, optical property-adjusting layer provided on the back side of the retroreflective element layer at a given area ratio so as to provide an adjusted hue, adjusted transparency, and adjusted retroreflectivity without impairing the appearance of the article.

BACKGROUND ART

Retroreflective articles that return back incident light toward the light source are well known. They have been widely used as a reflector of traffic or commercial signs, such as traffic signs, regulating signs, informative signs, and construction signs, or a reflector of visible, laser or infrared light reflective sensors.

In particular, retroreflective articles having a retroreflective element layer composed of an array of a large number of total internal reflective, cube corner retroreflective elements have recently been broadening their application because of their higher retroreflection efficiency, brighter colors for higher visibility, and capability of being backlighted and transmitting the backlight as compared with retroreflective articles using glass microspheres.

Several techniques have been disclosed with respect to the structure of retroreflective articles using the total internal reflective, cube corner retroreflective elements. For example, JP 46-25177B (Patent Document 1) discloses a retroreflective monolithic product of a transparent material having a smooth front surface and a rear surface having a plurality of retroreflecting units each having a set of three mutually perpendicular facets, the rear surface having transparent septa, the septa intersecting to define and isolate a plurality of polygonal cells each from the other, each cell having an area not greater than about six square inches and containing at least three of the cube-corner retroreflecting units, the septa having free edges positioned rearward of the front surface at least as far as the cube-corner retroreflecting units, which free edges permit the structure to be affixed to a backing to hermetically seal the cells individually, and the combined area of the septa being not greater than the combined area of the retroreflecting units.

JP 2001-33609A (Patent Document 2) discloses cube corner retroreflective sheeting comprising a combination of hermetically sealed cells of at least two different kinds, each cell being formed of a light transmitting prism layer, an air layer on the back side of the prism layer, and a binder layer on the back side of the air layer, the prism layer being composed of a light transmitting holding layer having a substantially smooth surface on the light incident side thereof, a face of a prism assembly formed of an array of close packed cube corner retroreflective elements on the back of the holding layer, and a septum integral with the retroreflective elements, the septum sticking beyond the apices of the cube corner elements and surrounding the face of the prism assembly, the top ends of the septum and the binder layer being connected to each other so that the air layer is defined by the septum, the prism assembly face, and the binder layer, wherein the cube corner retroreflective sheeting contains a prism layer comprising retroreflective elements whose optical axis is tilted relative to the vertical line of the light incident side surface and/or a prism layer comprising retroreflective elements of which at least one prism apex angle (the angle at the point of intersection of two facets out of three making the retroreflective element) is slightly deviated from 90 degrees.

The total internal reflective cube corner retroreflective elements used in these techniques are designed to be in contact with an air layer to exhibit retroreflective properties. With respect to a retroreflective article having a retroreflective element layer formed of an array of a large number of such retroreflective elements, it is unknown to provide a layer other than a binder layer on the back side of the retroreflective element layer.

U.S. 2005/0221042A1 (Patent Document 3) discloses retroreflective laminate sheeting having a viewing surface comprising a retroreflective layer having a first cap-Y value of a viewing surface side thereof, and a plurality of discrete pigmented indicia disposed on the viewing surface side of the retroreflective layer, wherein the pigmented indicia define a second cap-Y value of the viewing surface of the sheeting, the second cap-Y value being less than the first cap-Y value.

The technique disclosed consists in adjusting the cap-Y value by the provision of pigmented indicia on the surface of the retroreflective element layer, giving no suggestion of providing a separate layer on the back side of the retroreflective element layer.

Patent Document 1:JP 46-25177B
Patent Document 2:JP 2001-33609A
Patent Document 3:U.S. 2005/0221042A1

DISCLOSURE OF THE INVENTION

An object of the invention is to provide a retroreflective article having adjusted optical properties without impairing the appearance of the article.

Applications of retroreflective articles include reflectors of traffic or commercial signs, such as traffic signs, regulating signs, informative signs, and construction signs, and reflectors of visible, laser or infrared light reflective sensors. The object of the invention is to provide a retroreflective article having optical properties adjusted as appropriate to these applications, which article can be produced efficiently by making use of existing products.

The object of the invention is accomplished by providing a retroreflective article including a retroreflective element layer having an array of a large number of total internal reflective, cube corner retroreflective elements, an optical property-adjusting layer partially provided on the back side of the retroreflective element layer, and an air layer on the back side of the optical property-adjusting layer.

The effect of the invention is that a retroreflective article having optical properties suited for use as a reflector of traffic or commercial signs, such as traffic regulating signs, informative signs, and construction signs, or a reflector of visible, laser or infrared light reflective sensors can be produced at low cost and high productivity by providing an optical property-adjusting layer having an adjusted hue or an adjusted area ratio on the back side of an existing retroreflective element layer by an easily adjustable method.

BRIEF DESCRIPTION OF THE ACCOMPANYING DRAWING

FIGS. 1 illustrate a triangular pyramidal cube corner element, one embodiment of the total internal reflective cube corner retroreflective element that can be used in the retroreflective article of the invention, of which FIG. 1(A) is a plan; FIG. 1(B) is a cross-section taken along line X-X'; and FIG. 1(C) is a cross-section taken along line Y-Y'.

FIGS. 2 illustrate a full-cube corner element, another embodiment of the total internal reflective cube corner retroreflective element that can be used in the retroreflective article of the invention, of which FIG. 2(A) is a plan; FIG. 2(B) is a cross-section taken along line X-X'; and FIG. 2(C) is a cross-section taken along line Y-Y'.

FIGS. 3 illustrate a semifull-cube corner element, still another embodiment of the total internal reflective cube corner retroreflective element that can be used in the retroreflective article of the invention, of which FIG. 3(A) is a plan; FIG. 3(B) is a cross-section taken along line X-X'; and FIG. 3(C) is a cross-section taken along line Y-Y'.

BEST MODE FOR CARRYING OUT THE INVENTION

Figure 1:
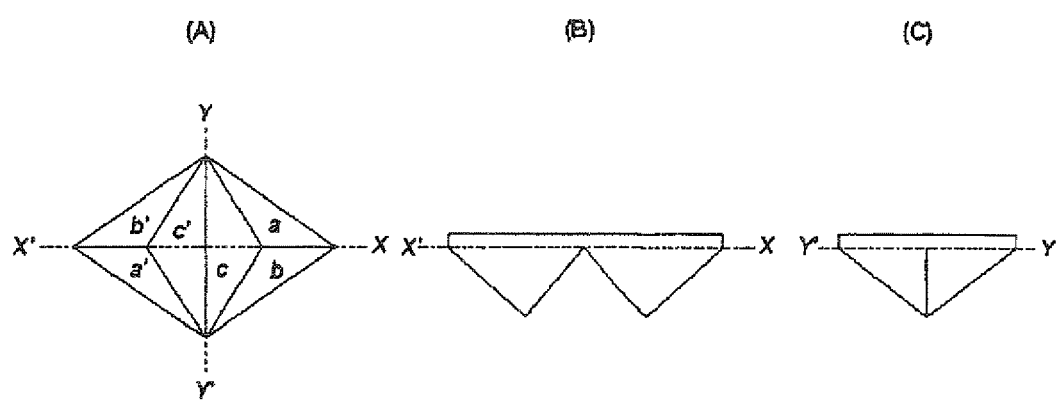

The means for achieving the object of the invention will be described in detail.

The present invention relates to a retroreflective article with an adjusted hue, adjusted transparency, and adjusted retroreflective characteristics, the article including a retroreflective element layer having an array of a number of total internal reflective, cube corner retroreflective elements and an optical property-adjusting layer partially provided on the back side of the retroreflective element layer.

The total internal reflective cube corner retroreflective elements that can be used in the retroreflective article of the invention are at least one kind of prism-based retroreflective elements selected from the group consisting of a triangular pyramidal cube corner element, a full-cube corner element, a semifull-cube corner element, a tent prism type cube corner element, and a cross prism element.

The optical property-adjusting layer provided on the back side of the retroreflective element layer serves to modify the appearance or the optical properties, such as brightness, hue, and hiding properties, of the retroreflective article.

The area ratio of the optical property-adjusting layer provided on the back side of the retroreflective element layer to the area of the back side of the retroreflective element layer is preferably 1% to 80%, more preferably 1% to 60%, in view of influences on the retroreflectivity on the front face and the appearance.

With the area ratio being greater than 60%, particularly greater than 80%, the retroreflective performance can reduce, and the appearance can be damaged.

When the area ratio is less than 1%, the effects on optical properties will be small.

The optical property-adjusting layer may be provided in any fashion, either continuously or discontinuously.

In the case where the optical property-adjusting layer is provided discontinuously, it is provided in discrete, independent regions. The area of the individual discrete regions is preferably 0.01 to 150 mm$^2$, more preferably 0.01 to 100 mm$^2$, even more preferably 0.05 to 50 mm$^2$, most preferably 0.1 to 25 mm$^2$.

The discrete regions of the optical property-adjusting layer are easily provided when the area of the individual regions is 0.01 mm$^2$ or more. With the area being not larger than 150 mm$^2$, preferably not larger than 100 mm$^2$, the front appearance of the retroreflective article will not be impaired by mottling.

In the case where the optical property-adjusting layer is provided continuously, it is provided in a straight line, a zigzag line, a curved line, or a combined shape thereof. The line width is preferably 0.1 to 8 mm, more preferably 0.1 to 5 mm, even more preferably 0.2 to 2 mm, most preferably 0.3 to 0.8 mm.

With the line width being 0.1 mm or more, such a line pattern of the optical property-adjusting layer can easily be provided. With the line width being not more than 8 mm, preferably not more than 5 mm, the optical property-adjusting layer will not impair the front appearance of the article.

The optical property-adjusting layer and the retroreflective element layer may be made of, though not exclusively, an ABS resin, a vinyl chloride resin, a polycarbonate resin, an acrylic resin, an epoxy resin, a styrene resin, a polyester resin, a fluorine resin, an olefin resin (e.g., a polyethylene resin or a polypropylene resin), a cellulosic resin, an urethane resin, a phenol resin, or a melamine resin.

The optical property-adjusting layer may be colored with various organic or inorganic pigments and dyes.

The optical property-adjusting layer may contain an ultraviolet absorber, a light stabilizer, an antioxidant, and so on, either alone or mixed, to have improved weather resistance.

The thickness of the optical property-adjusting layer is not particularly limited and is desirably decided according to the size of the retroreflective element layer.

The height of the retroreflective element layer being taken as h, the thickness of the optical property-adjusting layer preferably ranges from h×0.1 to h×0.7. With the thickness of the optical property-adjusting layer falling within that range, the optical property-adjusting layer can easily be provided, and the optical property can be adjusted with ease.

The optical property-adjusting layer may be provided by any method. For example, a coating composition containing the above described resin is applied to the back side of the retroreflective element layer by letterpress printing, gravure printing, screen printing, inkjet printing, or a like coating technique.

The type of the retroreflective element layer having an array of total internal reflective, cube corner retroreflective elements, on which the optical property-adjusting layer is to be provided by the method described, is not at all limited.

The distribution pattern of providing the optical property-adjusting layer can easily be altered by changing the plates or rolls in letterpress printing, gravure printing, or screen printing.

It does not matter whether or not the retroreflective element layer has a hermitically sealed structure formed by a binder layer other than the optical property-adjusting layer.

The structure having an air layer on the back side of the optical property-adjusting layer may be a structure in which the retroreflective element layer is not bonded to other than the optical property-adjusting layer, and the retroreflective element layer and/or the optical property-adjusting layer is/are in contact with open air or a structure in which the retroreflective element layer and/or the optical property-adjusting layer is/are hermetically sealed by a binder layer such that the retroreflective element layer and/or the optical property-adjusting layer is/are in contact with air entrapped in the sealed structure.

For the purpose of increasing the critical angle satisfying the conditions for total internal reflection, the retroreflective article has an air layer on the back side of the retroreflective element layer (on the back side of the optical property-adjusting layer). It is preferred to hermetically seal the retroreflective element layer by a binder layer in order to prevent inconveniences, such as reduction of the critical angle due to water penetration under the conditions of use.

The hermetical sealing of the retroreflective element layer can be achieved by, for example, the methods taught in U.S. Pat. Nos. 3,190,178 and 4,025,159 and JP U-50-28669A.

Examples of the resins that can be used to form the binder layer include (meth)acrylic resins, polyester resins, alkyd resins, and epoxy resins. Bonding of the binder resin may be achieved through any known methods using a heat fusible resin, a thermoplastic resin, an ultraviolet curing resin, an electron bean curing resin, and so on.

The binder layer used in the invention is bonded in part to the retroreflective element layer and/or the optical property-adjusting layer to form a hermetically sealed structure.

The retroreflective article of the invention may further includes a support layer under the binder layer.

The support layer may be formed of the resin forming the retroreflective element layer or commonly used film-forming resins, either individual or mixed.

When a support layer is provided, the binder layer may be formed over the entire area of the support layer or in selected regions where the binder resin is bonded to the retroreflective element by, for example, printing techniques.

Using the above described means is advantageous in that retroreflective articles with optimized optical properties can be produced from conventional retroreflective element layers using non-complicated equipment at low cost and increased productivity.

The present invention will further be illustrated by way of the accompanying drawings.

FIG. 1 schematically illustrate a triangular pyramidal cube corner element, one embodiment of the total internal reflective cube corner retroreflective element that can be used in the retroreflective article of the invention, of which FIG. 1(A) is a plan; FIG. 1(B) is a cross-section taken along line X-X'; and FIG. 1(C) is a cross-section taken along line Y-Y'.

The triangular pyramidal cube corner elements are usually arrayed in symmetrical pairs. Their optical axes are preferably tilted in view of incident angle characteristics.

A set of three facets (a set of facets a, b, and c or a set of facets a', b', and c') forming one element are substantially mutually perpendicular but may be slightly deviated from mutual perpendicular relation in order to improve observation angle performance.

Figure 2:
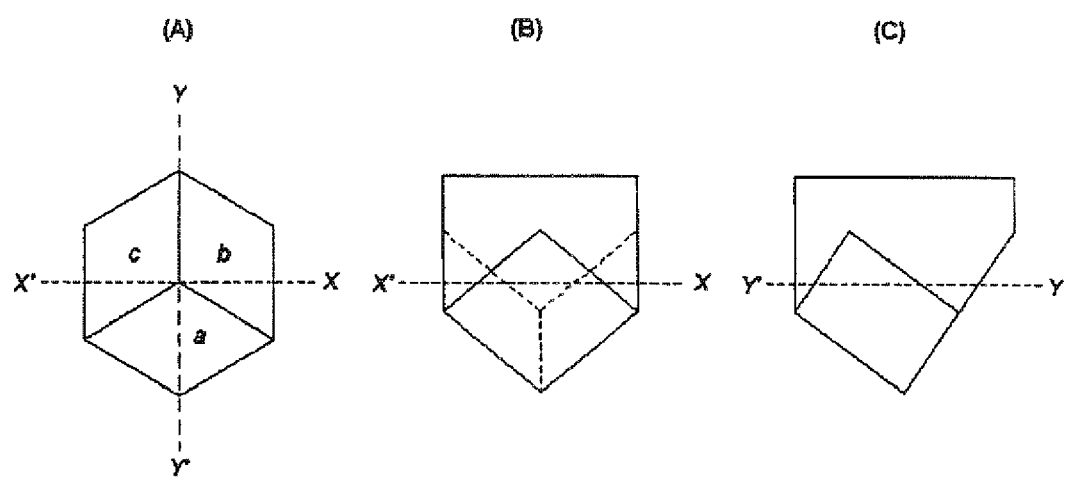

FIG. 2 illustrate a frill-cube corner element, another embodiment of the total internal reflective cube corner retroreflective element that can be used in the retroreflective article of the invention, of which FIG. 2(A) is a plan; FIG. 2(B) is a cross-section taken along line X-X'; and FIG. 2(C) is a cross-section taken along line Y-Y'.

The full-cube corner element preferably has its optical axis tilted to increase reflection efficiency at a high incident angle.

A set of three facets (a, b, and c) forming one element are substantially mutually perpendicular but may be slightly deviated from mutual perpendicular relation in order to improve observation angle performance.

Figure 3:
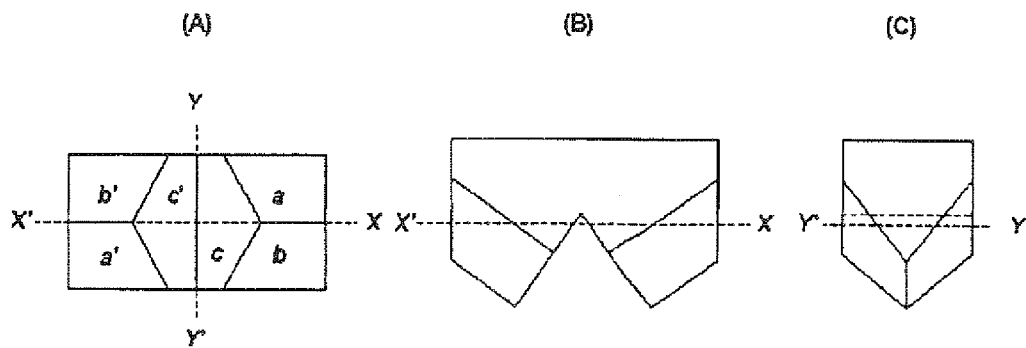

FIG. 3 illustrate a semifull-cube corner element, still another embodiment of the total internal reflective cube corner retroreflective element that can be used in the retroreflective article of the invention, of which FIG. 3(A) is a plan; FIG. 3(B) is a cross-section taken along line X-X'; and FIG. 3(C) is a cross-section taken along line The semifull-cube corner elements are usually arrayed in symmetrical pairs. It is preferred that their optical axes be tilted to increase reflection efficiency at a high incident angle.

A set of three facets (a set of a, b, and c or a set of a', b', and c') forming each element are substantially mutually perpendicular but may be slightly deviated from mutual perpendicular relation in order to improve observation angle performance.

Figure 4:
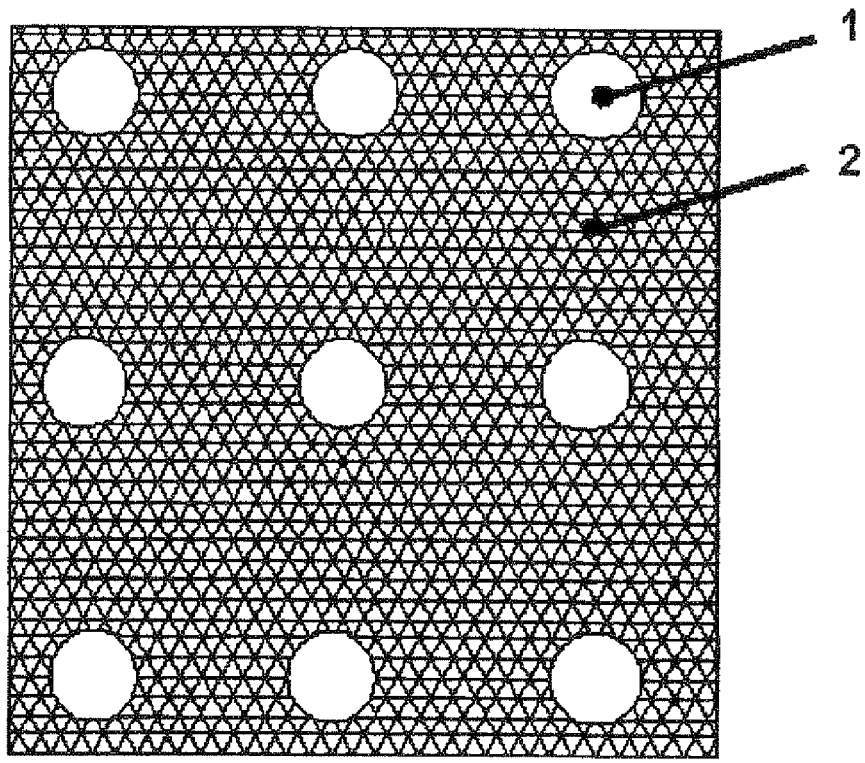
FIG. 4 is a plan showing an example in which an optical property-adjusting layer is provided in discrete independent regions on the back side of a retroreflective element layer.
Figure 5:
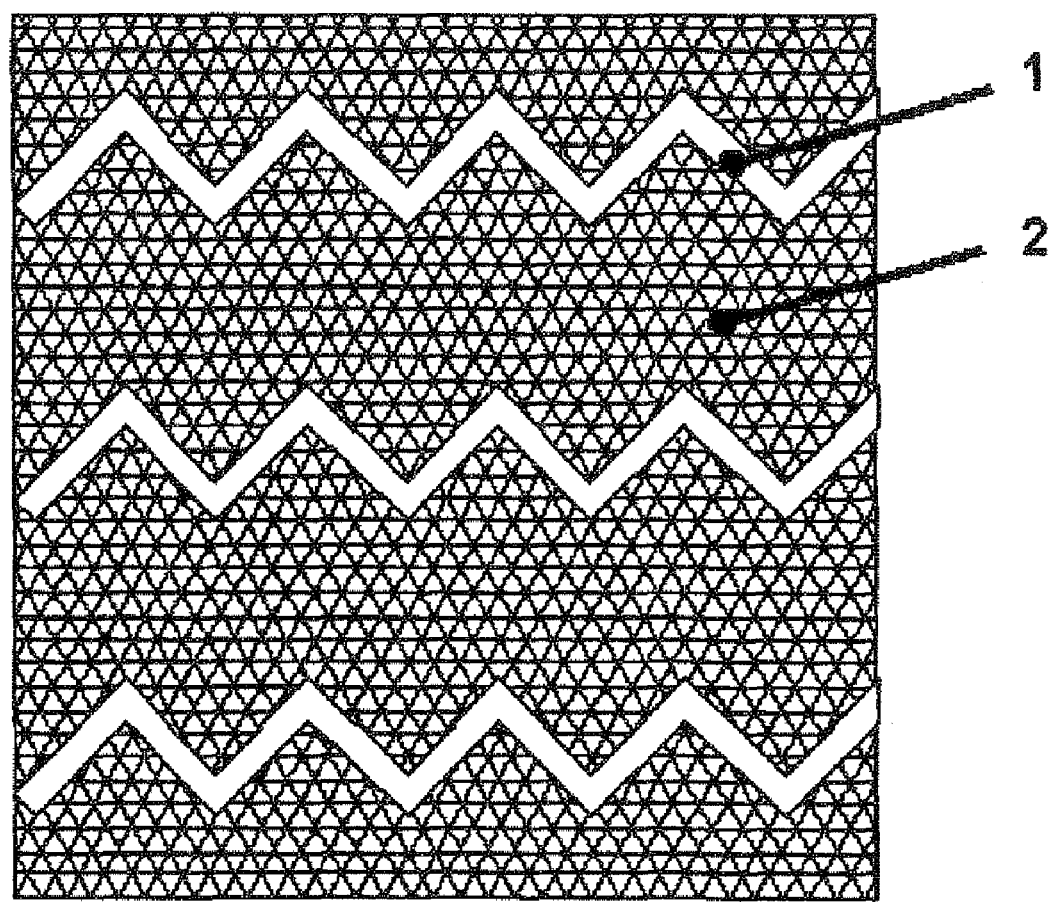
FIG. 5 is a plan showing another example in which an optical property-adjusting layer-adjusting layer is provided in continuous zigzag lines.

FIGS. 4 and 5 are each a schematic plan showing an example of a retroreflective element layer (2) provided with an optical property-adjusting layer (1).

The pattern of distributing the optical property-adjusting layer is not particularly limited and may be a dot pattern as illustrated in FIG. 4 or a zigzag pattern as illustrated in FIG. 5. It is preferred that the discrete regions or straight-linear, zigzag, or curved lines be equally spaced.

EXAMPLES

The present invention will now be illustrated in greater detail with reference to Examples, but it should be understood that the invention is not construed as being limited thereto.

The values and results of evaluation described in Examples and Comparative Examples were obtained in accordance with the following methods.

(1) Retroreflectivity

Retroreflectivity of retroreflective articles was determined using a retroreflectometer (Model 920, from Gamma Scientific) in accordance with MS Z-9117 at an observation angle of 0.2° and 0.5° and an entrance angle of 5° and 30°.

(2) Appearance

The appearance of retroreflective articles was observed with the naked eye (a) under a 165 standard light source (method A) or (b) as lighted by a spotlight 5 m away from the article (method B). A sample with good appearance was rated "good". A sample with distinguishable mottle was rated "medium". A sample with noticeable mottle was rated "poor".

(3) Light Transmitting Properties

The retroreflective articles were irradiated with light from its back side. The light transmitted through each sample was photographed with a digital camera with a fixed aperture and a fixed shutter speed. The samples were ranked in order to brightness of the transmitted light.

Preparation of Molding Die:

A 150 mm square copper plate with a flat polished surface was prepared. A number of 80 μm-deep, V-shaped parallel grooves $V_x$ extending in a first direction were cut into the plate at a pitch of 160 μm by fly cutting with a diamond cutting tool having a tip angle of 90°. A number of 80 μm-deep, V-shaped parallel grooves $V_y$ and a number of 80 μm-deep, V-shaped parallel grooves $V_z$ were then cut both at a pitch of 184.752 μm in directions making an angle of +54.7356° and −54.7356°, respectively, with the first direction, by fly cutting using a diamond cutting tool having a tip angle of 60° to make a master mold having a large number of convex triangular pyramidal cube corners.

The three facets forming every triangular pyramidal cube corner were mutually perpendicular, and each cube corner had an optical axis tilted about 9.74°.

Nickel was electrodeposited on the master mold in a nickel sulfamate bath to make a molding die for producing an array of inverted (concave) triangular pyramidal cube corner elements.

Comparative Example 1

A hundred parts by weight of a bisphenol polycarbonate resin (lupilon 113000, from Mitsubishi Engineering-Plastic Corp.) and 0.2 parts by weight of an ultraviolet absorbent (Tinuvin 1577, from Ciba-Geigy Japan) were mixed in a high speed rotating mixer (a Henschel mixer, from Mitsui. Mining Co., Ltd.) at 100 rpm for 15 minutes. The resulting molding material was extruded from a single screw extruder having an LID of 30 and a compression ratio of 3.0 at an extruding temperature of 240° C. and 50 rpm through a 4 mm diameter nozzle, cooled in water, and pelletized.

The pellets were dried at 80° C. for 12 hours. The pellets were extruded in a single screw extruder having an L/D of 30 and a compression ratio of 3.0 at an extruding temperature of 240° C. and 50 rpm into a 180 μm thick polycarbonate The resulting extruded polycarbonate film was laminated with a 75 μm thick acrylic resin film (Acryplen HBL360, from Mitsubishi Rayon Co., Ltd.), which contains 1.8 parts of an ultraviolet absorber Tinuvin 1577 (from Ciba-Geigy Japan), by thermal bonding using a pair of heat rolls set at 200° C. The laminate sheet was fed onto the molding die with the polycarbonate film contacting the die, compression formed at 190° C. and 50 kg/cm$^2$, cooled to 30° C. in the mold under pressure, and taken out to give a retroreflective article precursor having a close packed array of a large number of triangular pyramidal cube corner elements.

Example 1

A composition prepared by mixing, with stirring, 100 parts by weight of an acrylic resin (RS-5000, from Nikka Polymer KK), 5.5 parts by weight of a curing agent (Nikalac MS-11, from Sanwa Chemical Co., Ltd.), and 27.7 parts by weight of a solvent (MIBK) was screen printed uniformly on the back side of the retroreflective element layer of the retroreflective article precursor in dots each having an area of 1 mm$^2$ at an area ratio of 20% and dried by heat to produce a retroreflective article having an optical property-adjusting layer.

Example 2

A retroreflective article was obtained in the same manner as in Example 1, except that the optical property-adjusting layer was provided by uniformly screen printing the composition in dots each having an area of 1 mm$^2$ at an area ratio of 50%.

Example 3

A retroreflective article was obtained in the same manner as in Example 1, except that the optical property-adjusting layer was provided by uniformly screen printing the composition in dots each having an area of 1 mm$^2$ at an area ratio of 80%.

Example 4

A retroreflective article was obtained in the same manner as in Example 1, except that the optical property-adjusting layer was provided by uniformly screen printing the composition in dots each having an area of 150 mm$^2$ at an area ratio of 20%.

Example 5

A retroreflective article was obtained in the same manner as in Example 1, except that the optical property-adjusting layer was provided by uniformly screen printing the composition in straight lines each having a width of 1 mm at an area ratio of 50%.

Example 6

A retroreflective article was obtained in the same manner as in Example 1, except that the optical property-adjusting layer was provided by uniformly screen printing the composition in straight lines each having a width of 8 mm at an area ratio of 50%.

Example 7

A retroreflective article was obtained in the same manner as in Example 1, except that the optical property-adjusting layer was provided by inkjet printing an ink (PJG-SOINK Clear Coat, from. Mutoh Industries, Ltd.) using a drop-on-demand piezoelectric inkjet printer (PJ-1304NX, from Mutoh Industries, Ltd.) in dots each having an area of 1 mm$^2$ at an area ratio of 20% at a resolution of 384 dpi.

Example 8

A hot melt polyester resin (Aron Melt PES-310SA40, from Toagosei Co., Ltd.)

as a binder layer was applied to a thickness of 20 μm on a 38 μm thick polyester film (Cosmoshine A4300, from Toyobo Co., Ltd.) as a support layer and dried by heat. The resulting laminate was heat embossed on a mold and press bonded to the retroreflective article of Example 1 to obtain a retroreflective article having a hermetically sealed structure in which the binder layer, the retroreflective element layer, and the optical property-adjusting layer were partially bonded together. The total area of the regions of the binder layer where the binder layer was bonded to the retroreflective element layer and the optical property-adjusting layer was about 22% of the area of the retroreflective article.

Example 9

A retroreflective article having a hermetically sealed structure in which a binder layer, a retroreflective element layer, and an optical property-adjusting layer were partially bonded together was obtained in the same manner as in Example 8, except for using the retroreflective article of Example 7 in place of that of Example 1. The total area of the regions of the binder layer where the binder layer was bonded to the retroreflective element layer and the optical property-adjusting layer was about 25% of the area of the retroreflective article.

The retroreflective articles of Examples 1 to 9 and the retroreflective article precursor of Comparative Example 1 were evaluated for retroreflectivity, appearance, and light transmitting properties. The results of evaluation are shown in Table 1.

TABLE 1

| | Retroreflectivity (cd·lux$^{-1}$·m$^{-2}$) | | | | | | Light Transmitting Properties |
|---|---|---|---|---|---|---|---|
| | Observation Angle = 0.2° | | Observation Angle = 0.5° | | Appearance | | |
| | Entrance Angle = 5° | Entrance Angle = 30° | Entrance Angle = 5° | Entrance Angle = 30° | Method A | Method B | |
| Comp. Example 1 | 1767 | 1222 | 592 | 576 | good* | good* | 10 |
| Example 1 | 1360 | 916 | 444 | 421 | good | good | 9 |
| Example 2 | 848 | 574 | 272 | 259 | good | good | 3 |
| Example 3 | 336 | 220 | 101 | 92 | good | medium | 1 |
| Example 4 | 1325 | 904 | 432 | 415 | medium | medium | 5 |
| Example 5 | 801 | 623 | 290 | 277 | good | good | 4 |
| Example 6 | 856 | 599 | 285 | 262 | good | medium | 2 |
| Example 7 | 1298 | 922 | 452 | 433 | good | good | 8 |
| Example 8 | 980 | 623 | 311 | 278 | good | good | 7 |
| Example 9 | 857 | 572 | 294 | 264 | good | good | 6 |

Note:
*Having no optical property-adjusting layer, the retroreflective article precursor of Comparative Example 1 was not to suffer from uneven appearance due to mottling.

INDUSTRIAL APPLICABILITY

The retroreflective article of the invention is useful as a reflector of traffic or commercial signs, such as traffic regulating signs, informative signs, and construction signs, or a reflector of visible, laser or infrared light reflective sensors. The retroreflective article of the invention has optical characteristics adjusted as appropriate to the intended use.

The invention claimed is:

1. A retroreflective article, comprising:
   a retroreflective element layer having an array of a large number of total internal reflective, cube corner retroreflective elements; and
   an optical property-adjusting layer partially provided on a back side of the retroreflective element layer,
   wherein the retroreflective element layer has a structure selected from the group consisting of
   i) the retroreflective element layer are not bonded to other than the optical property-adjusting layer, and at least one of the retroreflective element layer and the optical property-adjusting layer is in contact with open air, and
   ii) the retroreflective element layer and the optical property-adjusting layer are hermetically sealed by a binder layer such that the retroreflective element layer and the optical property-adjusting layer are in contact with air entrapped in the sealed structure.

2. The retroreflective article according to claim 1, further comprising a binder layer, the binder layer and the retroreflective element layer forming a hermetically sealed structure.

3. The retroreflective article according to claim 2, wherein the retroreflective element layer and/or the optical property-adjusting layer is partially bonded to the binder layer.

4. The retroreflective article according to claim 1, wherein the optical property-adjusting layer has an area ratio of 1 to 60%.

5. The retroreflective article according to claim 1, wherein the optical property-adjusting layer is discontinuous in the form of discrete independent regions, each region having an area of 0.01 to 100 mm$^2$.

6. The retroreflective article according to claim 1, wherein the optical property-adjusting layer is continuous in the form of a straight line, a zigzag line, a curved line, or a combined shape thereof.

7. The retroreflective article according to claim 1, wherein the optical property-adjusting layer is colored with an organic or inorganic pigment or dye.

8. The retroreflective article according to claim 1, wherein the optical property-adjusting layer contains an ultraviolet absorber, a light stabilizer, an antioxidant, or a combination thereof.

9. The retroreflective article according to claim 1, wherein the total internal reflective cube corner retroreflective elements comprise at least one kind selected from the group consisting of a triangular pyramidal cube corner element, a full-cube corner element, a semi full-cube corner element, a tent prism type cube corner element, and a cross prism element.

10. The retroreflective article according to claim 2, wherein the optical property-adjusting layer has an area ratio of 1 to 60%.

11. The retroreflective article according to claim 3, wherein the optical property-adjusting layer has an area ratio of 1 to 60%.

12. The retroreflective article according to claim 2, wherein the optical property-adjusting layer is discontinuous in the form of discrete independent regions, each region having an area of 0.01 to 100 mm$^2$.

13. The retroreflective article according to claim 3, wherein the optical property-adjusting layer is discontinuous in the form of discrete independent regions, each region having an area of 0.01 to 100 mm$^2$.

14. The retroreflective article according to claim 4, wherein the optical property-adjusting layer is discontinuous in the form of discrete independent regions, each region having an area of 0.01 to 100 mm$^2$.

15. The retroreflective article according to claim 2, wherein the optical property-adjusting layer is continuous in the form of a straight line, a zigzag line, a curved line, or a combined shape thereof.

16. The retroreflective article according to claim 3, wherein the optical property-adjusting layer is continuous in the form of a straight line, a zigzag line, a curved line, or a combined shape thereof.

17. The retroreflective article according to claim 4, wherein the optical property-adjusting layer is continuous in the form of a straight line, a zigzag line, a curved line, or a combined shape thereof.

18. The retroreflective article according to claim 2, wherein the optical property-adjusting layer is colored with an organic or inorganic pigment or dye.

19. The retroreflective article according to claim 3, wherein the optical property-adjusting layer is colored with an organic or inorganic pigment or dye.

20. The retroreflective article according to claim 4, wherein the optical property-adjusting layer is colored with an organic or inorganic pigment or dye.

* * * * *